Figure 1:
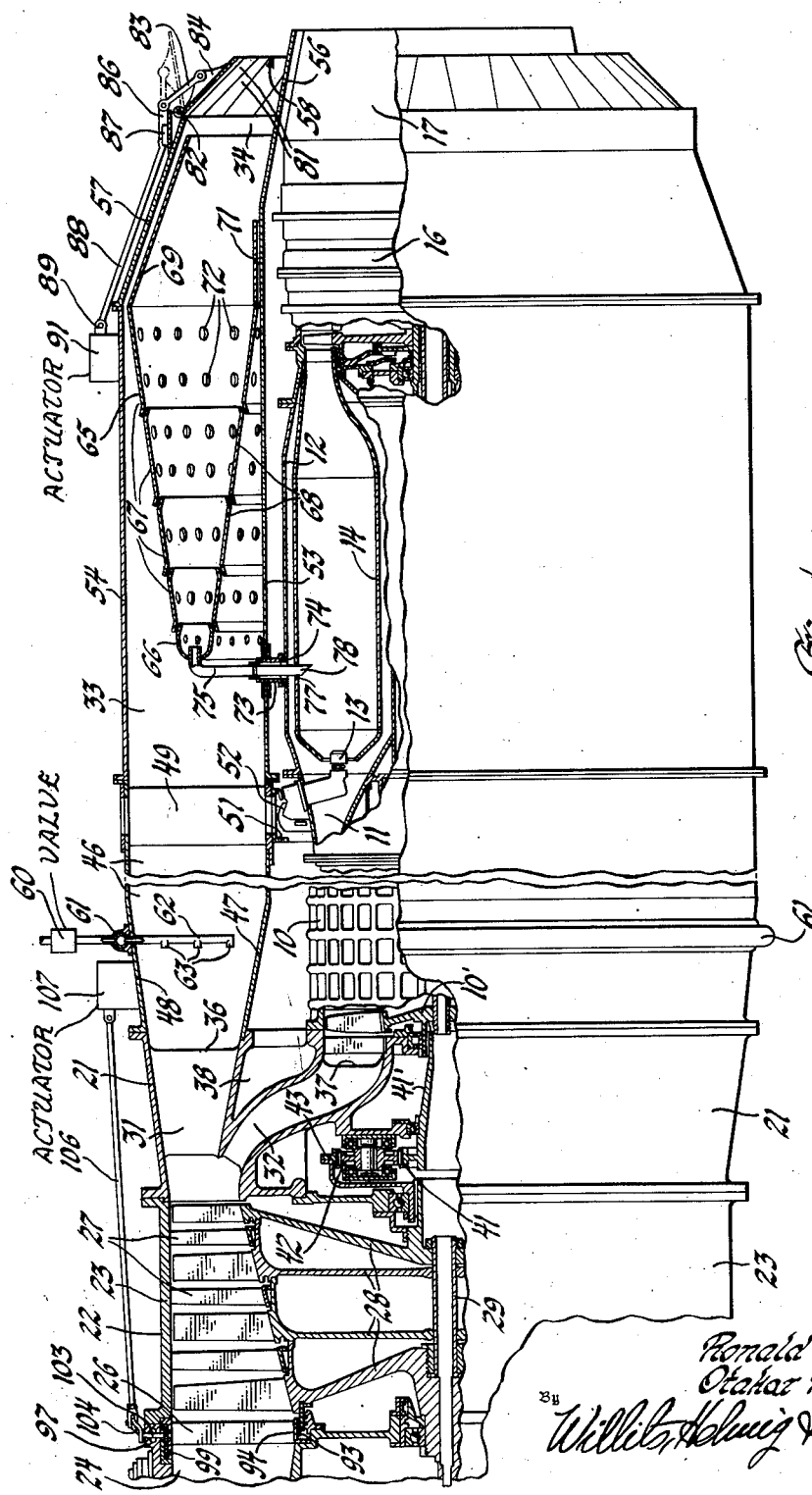

July 9, 1957

R. M. HAZEN ET AL 2,798,360

DUCTED FAN TYPE JET PROPULSION ENGINE

Filed Oct. 6, 1950

3 Sheets-Sheet 1

Inventors
Ronald M. Hazen &
Otakar P. Prachar
By Willis, Helmig & Baillio
Attorneys

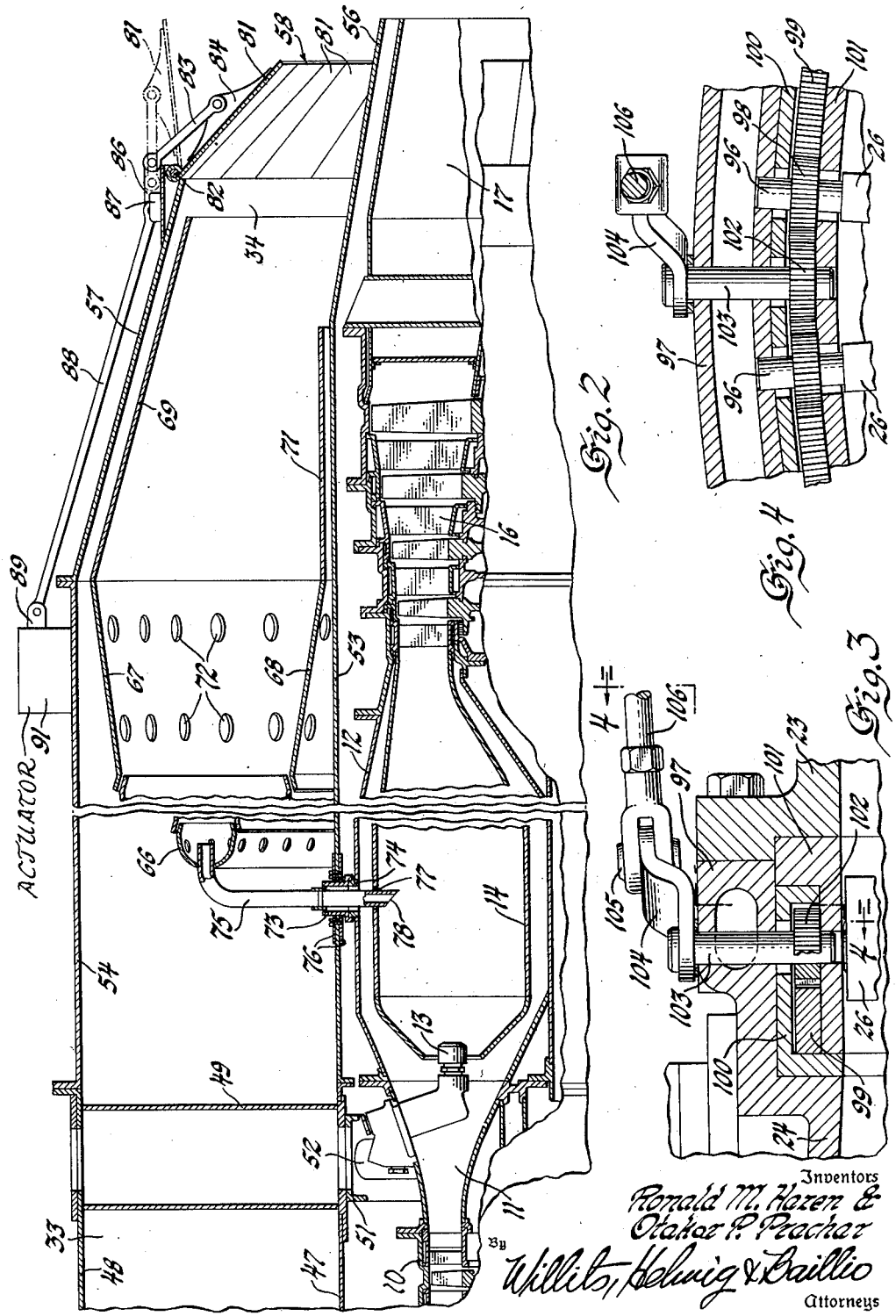

July 9, 1957  R. M. HAZEN ET AL  2,798,360
DUCTED FAN TYPE JET PROPULSION ENGINE
Filed Oct. 6, 1950  3 Sheets-Sheet 3
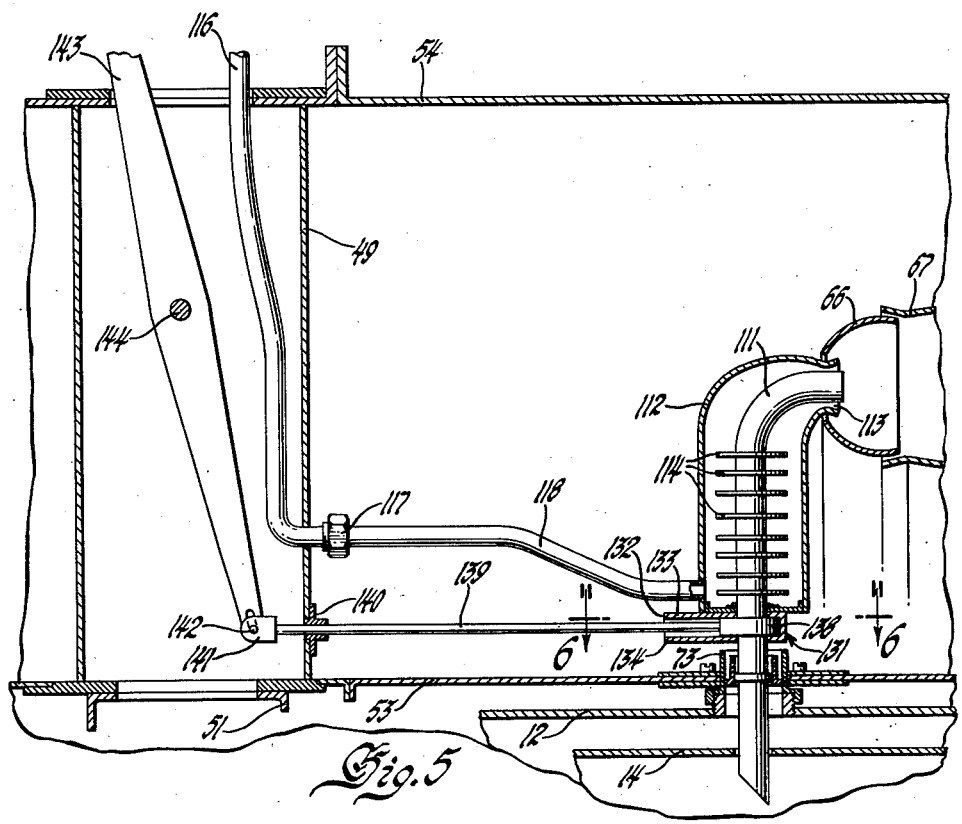
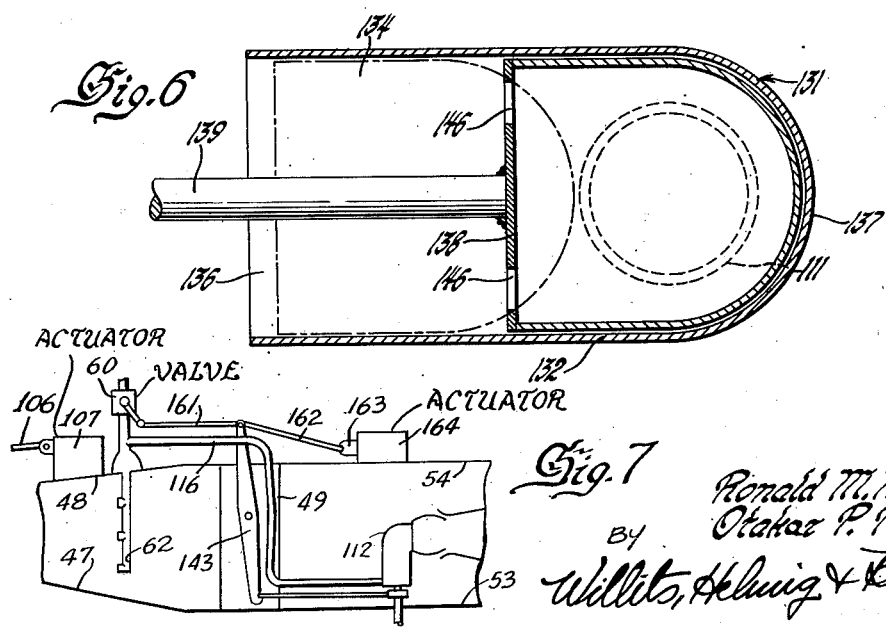
Inventors
Ronald M. Hazen &
Otakar P. Pracher
By Willits, Helwig & Baillio
Attorneys United States Patent Office 2,798,360
Patented July 9, 1957

2,798,360

DUCTED FAN TYPE JET PROPULSION ENGINE

Ronald M. Hazen and Otaker P. Prachar, Indianapolis, Ind., assignors to General Motors Corporation, Detroit, Mich., a corporation of Delaware Application October 6, 1950, Serial No. 188,717

8 Claims. (Cl. 60—35.6)

This invention relates primarily to gas turbine power plants of the jet propulsion type such as are used for aircraft propulsion. Simple jet propulsion engines commonly comprise an air compressor, one or more combustion chambers supplied by the compressor, a turbine, energized by the products of combustion, driving the compressor, and an exhaust cone or nozzle through which the combustion products are expelled at high velocity to provide a propulsive thrust.

Turboprop engines differ from such jet engines in that the turbine extracts more energy from the hot gas and drives a propeller in addition to the compressor. In these engines the jet thrust is accordingly much reduced.

This invention is concerned with an engine in which a power plant of the gas turbine type drives a low pressure compressor or ducted fan in addition to the normal compressor of the gas turbine engine, and thrust is developed by the exhaust from the gas turbine and by the air stream from the ducted fan. A part of the discharge from the ducted fan is fed to the gas turbine compressor, the fan thus serving as a low pressure first compressor for the gas turbine engine. The engine includes provision for augmentation of thrust for takeoff and for emergency power requirements by burning fuel in that part of the output of the ducted fan which by-passes the turbine.

The invention includes provision for enlarging the area of the ducted fan exhaust when the volume of the exhaust is increased by burning fuel therein. It also involves provision for varying the effective inlet area of the ducted fan to secure suitable starting characteristics for the engine. It further involves ignition of the fuel burned for thrust augmentation from the continuously operating combustion chambers which supply the turbine. The engine may also include means for diverting a portion of the hot gases from the continuously operating combustion chambers, at will, for igniting the fuel burned for thrust augmentation and for heating or vaporizing a portion of this fuel for improved ignition thereof. By virtue of these features of the invention, it is possible to provide an engine which gives relatively high thrust with high efficiency in normal operation and which gives greatly augmented thrust for emergency operation and takeoff with lower but acceptable efficiency; and which is of relatively light weight and relatively compact for its power output capacity. Moreover, the engine has satisfactory starting characteristics and simple control mechanisms. It eliminates the need for additional ignition equipment for the thrust augmenting burners.

It is believed that the objects and advantages of the invention will be apparent to those skilled in the art from the foregoing discussion. The objects and advantages and the manner in which they are achieved will be more fully apparent from the appended description of the preferred embodiment of the invention and the accompanying drawings, in which Figure 1 is a longitudinal view, partially in section, of an engine in accordance with the invention; Figure 2 is a partial sectional view of the same on a larger scale; Figure 3 is a detail sectional view of the inlet guide vane adjusting mechanism taken on a plane containing the axis of the engine; Figure 4 is a sectional view of the same taken on a plane perpendicular to the axis of the engine indicated by the line 4—4 in Fig. 3; Figure 5 is a partial sectional view of an engine with a fuel heating device; Figure 6 is a sectional view of a valve therein, taken on the plane indicated by the line 6—6 in Figure 5; and Figure 7 is a somewhat schematic partial view illustrating the actuation of the igniter of Figs. 5 and 6.

Referring first to Figures 1 and 2, the invention in its preferred embodiment comprises a gas turbine power unit including a multistage axial-flow compressor 10 discharging through an annular diffuser 11 into a plurality of generally cylindrical combustion chambers or combustors 12 disposed circumferentially around and generally parallel to the axis of the engine. Combustion of fuel injected through nozzles 13 is effected in flame tubes 14 in the combustion chambers. The hot gases from the flame tubes are discharged into a multistage axial-flow turbine 16 and from the turbine into an exhaust cone or nozzle 17. The turbine, as is customary, is coupled to the compressor by a shaft (not illustrated) extending along the axis of the engine. This shaft may be shown in U. S. Patent No. 2,693,248. The structure so far described may be conventional and, in fact, as illustrated, is that of a previously-known gas turbine engine, the details of which are immaterial to the invention and need not be further described.

A frame 21 bolted to the forward end of the compressor 10 provides the air inlet to the compressor and a diffuser for the first compressor or ducted fan 22, the casing 23 of which is fixed to the forward end of the frame 21. A forwardly facing annular air inlet 24, only the rear portion of which is shown, conducts air to the fan 22, which is preferably a multistage axial-flow compressor comprising angularly adjustable inlet guide vanes 26, fixed interstage vanes 27, and rotating blade stages mounted on wheels 28 fixed to shaft 29. Except as hereinafter more specifically described, the construction of compressor 22 may follow standard practice familiar to those skilled in the art. Therefore, the structure is not described in detail. The output of fan 22 is divided between two concentric annular diffusing ducts 31 and 32, the duct 32 converging in diameter and discharging into the inlet of compressor 10. The discharge from duct 31 flows through a thrust-augmenting burner duct structure 33 to an annular exhaust duct 34 disposed around the turbine exhaust 17.

While design parameters may vary, in the presently preferred embodiment the relative areas of the ducts 31 and 32 are such that approximately one-third of the output of the fan 22 is supplied to the gas turbine. Streamlined radial struts 36 and 37 in the ducts 31 and 32, with struts 38 between the ducts, provide structural rigidity of the frame 21 and remove swirl from the air passing through the ducts.

The compressor 10 is driven directly from the turbine through the interconnecting shaft at a suitable speed, which may be approximately 15,000 R. P. M. The ducted fan, being of larger diameter, must rotate more slowly and is preferably driven at about 6,000 R. P. M.. The forward end of the compressor 10 drives the fan shaft 29 through reduction gearing.

Preferably this reduction gear comprises a driving pinion 41 coupled to the engine shaft by a spline connection between the pinion shaft 41' and the hub of the first compressor wheel 10', idler gears 42 on fixed shafts mounted on the frame 21, and a ring gear 43 on the fan shaft 29. It will be noted that this construction rotates the fan in a reverse direction to the gas turbine, thus reducing the gyroscopic effect of the rotating parts.

The annular air duct, indicated generally as 33, supplied from the outlet 31 of the fan, comprises an entrance section 46 of gradually increasing cross-sectional area defined by inner and outer generally conical walls 47 and 48, respectively. The after portions of the inner and outer walls 47 and 48 are cylindrical, and the walls are joined by streamlined radial struts 49 adjacent to the rear end of the sections 47 and 48, which struts are disposed in the same longitudinal zone as the diffuser 11. A channel 51 reinforces the inner ring at the struts and supports the diffuser 11 through support members 52. The rear ends of the walls 47 and 48 are flanged for attachment of the cylindrical inner and outer walls 53 and 54 constituting a continuation of the duct, wall 53 enclosing the combustion chambers 12, turbine 16, and the exhaust cone 17. The after portion 56 of the wall 53 preferably tapers inwardly and terminates in the same plane as the nozzle 17. A frusto-conical ring 57 is fixed to the rear end of the cylinder 54 and bears adjustable nozzle plates 58. It will be noted that the air duct 33 formed by the members 47, 48, 53, 54, and 57 thus comprises an annular passage surrounding the gas turbine engine, with a diverging entrance portion and a converging outlet portion. The members 47, 48, 53, and 54 may be split longitudinally into sections for convenient assembly and disassembly, if desired. Conduits for fuel, electrical circuits, and so forth, may be led to the gas turbine engine through the struts 36 and 49.

Fuel may be injected into and burned in the duct 33 for thrust augmentation, the combustion of the fuel increasing the energy of the jet. Fuel may be supplied from a source (not shown) controlled by a valve 60 through a ring manifold 61 from which branch pipes 62 extend into duct 33 at intervals, the pipes 62 being provided with spray nozzles 63. As shown, the nozzles are arranged for upstream injection into the forward part of the duct, but the position and direction of the nozzles may be varied. Injection into the forward part of the duct promotes vaporization of the fuel, which is burned in the after part of the duct in an annular combustion space or flame holder 65. This flame holder comprises a channel ring 66 and a plurality of conical rings 67, forming an outer surface, and 68, forming an inner surface. The last ring 67 continues into a tapering portion 69 within the casing portion 57 and the final inner ring 68 comprises a cylindrical portion 71. A small portion of the unburned fuel and air mixture passes between the members 57 and 69 and between the members 53 and 71 to cool the parts 69 and 71 directly exposed to the heat of combustion. The rings 67 and 68 overlap slightly, and the leading edge of each ring is slightly spaced from the trailing edge of the ring immediately ahead except at intervals, where they may be welded or otherwise fixed together. Air entering between the edges of the rings prevents undue heating of the joints and provides a cooling air layer within the flame holder. The rings 67 and 68 are perforated, as indicated at 72, so that the air passes readily through the flame holder. The principal purposes of the flame holder are to provide a zone favorable to the maintenance of combustion and to protect the walls 53 and 54 from the heat of combustion. It is necessary, for efficient operation, that they present a minimum resistance to air flow and that they establish such conditions as a proper degree of turbulence and sufficiently low rate of air movement that the flame will not blow out. The velocity of air entering the flame holder between the rings and through the perforations 72 may be kept sufficiently high to prevent the flame from striking back.

Means are provided to ignite the fuel in the duct 33 whenever required from the combustion chambers 12 which are in continuous operation. In one form of the invention, this means comprises cross-ignition tubes 75 extending from within each flame tube 14 into the channel 66. These tubes are mounted in bushings 73. As shown more clearly in Figure 2, the bushings 73 are threaded onto rings 74 fixed in the walls of the combustion chambers 12 and pass through reinforcing plates 76 in the wall 53. The tubes 75, which are bent at right angles, are slidably mounted in the bushings 73 and pass through the openings 77 in the flame tubes, this construction accommodating differences in expansion. The inner ends of the tubes 75 may be scarfed as indicated at 78. When the combustion chamber 12 is in operation, a small amount of the burning gas is conducted through the tubes 75 into the flame holder member 66, which establishes a relatively quiet air zone in which the fuel in duct 33 is ignited, the combustion in this duct continuing as the fuel-air mixture flows to the exhaust nozzle.

The variation in the volume of the air flow between non-burning and burning or augmentation conditions requires a variation in the cross-sectional area of the outlet from duct 33. While various structures have been proposed for varying the area of jet nozzles, we prefer to employ a construction composed of a plurality of interlocking overlapped plates 81, each plate being pivoted or hinged on a pin 82 fixed to the rear edge of the duct 57. The plates 81 are shown in full lines in the position of reduced aperture, and one plate is indicated in broken lines in the nozzle open position. Since such structures are known, a detailed description thereof will be omitted in the interest of conciseness. The means for actuating one plate 81, illustrated in Figure 2, comprises a link 83 pivoted to a rib 84 extending from the plate and to a block 86 slidably mounted on a bracket 87 fixed to the cone 57. The block 86 is connected by a link 88 to a reciprocating member 89 of an actuator of any suitable type indicated at 91, which may be a remotely-controlled electrical or hydraulic actuator or the equivalent, if desired.

The preferred arrangement for varying the inlet of the compressor, illustrated generally in Figure 1, and in detail in Figures 3 and 4, comprises inlet guide vanes 26 rotatable about generally radial axes. The inner ends of the vanes are formed with projecting pins 93 (Figure 1) extending through the inner blade ring 94. The outer ends of the blades are provided with stub shafts 96 journaled in the rear flange portion 97 of the inlet duct structure 24. A pinion 98 on each shaft engages a gear ring 99 formed with teeth on the rear face. The pinions 98 and the ring 99 are housed between flanged rings 100 and 101 fitted between the inlet duct 24 and compressor casing 23. Thus, by rotation of ring 99, the angle of the blades 26 may be varied in unison. This rotation is effected by a pinion 102 on a shaft 103 journaled in the flange 97. The shaft 103 is coupled by the crank arm 104, pin 105, and link 106, to an actuator 107 (Fig. 1) which, like actuator 91, may be of any suitable type.

In normal operation, the guide vanes 26 are set at a proper angle to give most efficient performance. However, in starting the power plant, the load due to fan 22 should be reduced so that the torque available from the gas turbine engine at low speeds is in excess of that demanded by the fan 22, so that the engine will be capable of accelerating the load. By rotating the vanes 26 to throttle the inlet, the load may be reduced to a point at which a starter suitable for the gas turbine power plant, without the ducted fan, will be sufficient to start the plant with the fan, and the speed of self-sustaining operation of the engine is low. The pivoted vanes thus eliminate the need for a very large starter with heavy power supply requirements or a clutch mechanism to relieve the gas turbine of the load due to the ducted fan when starting.

The operation of the engine will presumably be apparent to those skilled in the art from the foregoing, but may be outlined. The gas turbine engine comprising compressor 10, combustion chambers 12, and turbine 16, is accelerated by a starting motor in the usual manner. Fuel is injected through the nozzles 13 and ignited by conventional mechanism and, when the gas turbine becomes self-sustaining, the starter is de-energized. When the engine is brought up to normal operation, the inlet guide vanes are opened so that the air blast from the ducted fan, passing through the duct 33, contributes to the thrust of the engine which is due also, in part, to the exhaust gases ejected from the nozzle 17. The ducted fan also precompresses the air entering the compressor 10 and thus contributes to the total compression of the air entering the combustion chambers 12. The thrust generated under these conditions may be varied by varying the fuel supply to the nozzles 13, as is well known, and is sufficient for ground operation and for normal cruising.

For increased thrust for takeoff or for maximum speed in the air, the valve 60 is opened to admit fuel to the nozzles 63 and the nozzle 58 is opened. The fuel-air mixture passing through the duct 33 enters the flame holder 65 and is ignited by jets of hot gas entering the flame holder through the tubes 75. In this connection, it may be noted that the pressure in the combustion chambers 12 is considerably higher than that in the duct 33, so that the hot gases are forced through the tubes 75. Increased energy of the gases in duct 33 due to the added heat energy provides a greatly increased thrust which accordingly improves the operational characteristics of the aircraft.

Figures 5, 6, and 7 illustrate a modification of the engine previously described, the objects of the modification being to improve combustion in the thrust augmenter at high altitudes and to eliminate the loss of energy due to bleeding air from the combustion chambers through the cross-ignition tubes when the thrust augmenter is not in operation. Figure 5 is an enlarged view of a portion of the engine taken on the same plane as Figure 2, with parts corresponding to those previously described indicated by the same reference numerals.

The modification may be described generally as involving the addition of a fuel heater or vaporizer to the cross-ignition tube with an outlet adjacent the outlet of the cross-ignition tube and the addition of a valve in the cross-ignition tube, with means for supplying fuel to the heater and means for operating the valve. The cross-ignition tube 111 may be similarly located to the cross-ignition tube 75 previously described, and is guided in a bushing 73 attached to the combustion chamber 12. Formed integral with the ignition tube 111 is a shell 112 providing the heating chamber for fuel. The shell 112 may be welded or otherwise fixed to the flame tube and terminates in an annular nozzle or fuel discharge opening 113 around the outlet of the crossover tube 111. Fins 114 are fixed to the tube 111 within the fuel heater for more effective heat transfer. Fuel may be supplied simultaneously with the supply of fuel to the nozzle 63 through a tube 116 disposed within the strut 49 and coupled by a union 117 to a tube 118 welded or otherwise fixed to the fuel vaporizer at the end opposite the outlet 113. The supply line 116 may be fed from the valve 60 (Figs. 1 and 7) so that, concurrently with the admission of fuel to the nozzle 63, a relatively small quantity of fuel is admitted into the heater 112 where it is heated, and may be partially vaporized, by heat from the hot gases passing through the tube 111, and is discharged through the nozzle 113. The air jet from the outlet of the tube 111 may act to aspirate the fuel from the heater and mix it with the hot gases to provide a pilot flame in the forward end of the flameholder 65. This feature may be particularly useful at very high altitudes where, as is well known, the ignition and maintenance of a flame are quite difficult. Figure 5 also illustrates a valve 131 mounted in the ignition tube 111 adjacent the inner wall 53 of the outer duct. This valve is provided to shut off the flow of gases through tube 111. As will be more clearly apparent from the enlarged sectional view of Figure 6, the valve comprises a housing 132, which may be a box of heat-resisting sheet metal such as stainless steel, inserted in the tube 111 with upper and lower sides 133 and 134 of the box welded or otherwise fixed to the upper and lower portions of the tube 111. The forward end 136 of the box is open and the rearward end 137 is closed and may be semi-cylindrical, as indicated in Figure 6. The movable member or gate 138 of the valve may likewise be a box of heat-resisting sheet metal or a casting of heat-resisting metal of such exterior dimensions as to fit within the valve body 132. The upper and lower faces of the gate 138 extend across the tube 111 when the valve is in the closed position indicated in Figure 6, and thus close the ignition tube. The valve gate is reciprocated in the housing 132 by a pull rod 139 welded or otherwise fixed to the forward face of the valve gate and guided in a sleeve 140 (Fig. 5) fixed to the strut 49. The pull rod 139 may be reciprocated by any convenient mechanism. A clevis fitting 141 may be threaded on the end of the pull rod and coupled by a pin 142 to a lever 143 pivoted on a pin 144 extending transversely to the strut 49 and mounted therein in any suitable manner. The lever 143 may be actuated by any suitable mechanism, either directly or by remote control, to open and close the valve 131 simultaneously with the admission of fuel to the nozzles 63 and shell 112.

Fig. 7 illustrates a conventional actuator 164 including an operated part 163 coupled through link 162 to the lever 143 and through a further link 161 to the operating lever of the valve 60 which supplies fuel to the spray pipe 62 and through tube 116 to the shell 112.

The valve 131 will be cooled by the airstream passing through the outer duct around the body of the valve, and should not require additional cooling, since the valve gate 138 is out of the direct path of flow through the tube 111 when the valve is open, and relatively little heat is supplied to the valve through the tube 111 when the valve is closed. The forward face of the valve member 138 may be formed with air vent openings 146. If the valve member is cast, it may be cored to provide a hollow member for lighter weight, economy of material, and better cooling.

A valve 131 may be provided in each ignition tube 111 whether or not a fuel heater is installed, since closing the valve would eliminate a certain loss of hot gases from the combustion chamber 12. Likewise, a fuel heater may be installed without the valve, although it is preferable to avoid passing hot gas through the heater unless it is supplied with fuel. A fuel vaporizer may be provided for each cross-ignition tube or a fuel vaporizer and pilot flame apparatus may be provided for only a portion of the ignition tubes, if desired.

The operation of the modified engine need not be described, since it is the same as that of the engine of Figures 1 to 4 except that the valves 131 are opened and fuel is supplied to the device or devices 112 when combustion is initiated in the outer duct.

The detailed description herein of the preferred embodiment of the invention is not to be considered as limiting the invention since many modifications of structure will occur to those skilled in the art within the scope of the invention.

We claim:

1. A gas turbine jet propulsion power plant comprising, in combination, a gas turbine engine comprising a power output shaft, a compressor, a combustor, and a turbine driving the output shaft and compressor; a low-pressure compressor driven by the said output shaft; a jet propulsion device comprising a combustion apparatus and a jet nozzle; ducting dividing the outflow from the low-pressure compressor between the gas turbine engine and the jet propulsion device; and means for ignition of fuel in the combustion apparatus comprising a hot gas tube extending from the combustor to the combustion apparatus, means for injecting fuel adjacent the outlet of the said tube, and means for heating the fuel before injection by heat transfer from the hot gas passing through the tube.

2. A gas turbine jet propulsion power plant comprising, in combination, a gas turbine engine comprising a power output shaft, a compressor, a combustor, and a turbine driving the output shaft and compressor; a low-pressure compressor driven by the said output shaft; a jet propulsion device comprising a combustion apparatus and a jet nozzle; ducting dividing the outflow from the low-pressure compressor between the gas turbine engine and the jet propulsion device; a means for ignition of fuel in the combustion apparatus comprising a hot gas tube extending from the combustor to the combustion apparatus, a valve in the tube, means for operating the valve, means for injecting fuel adjacent the outlet of the said tube, and means for heating the fuel before injection by heat transfer from the hot gas passing through the tube.

3. A gas turbine power plant comprising, in combination, two combustion chambers, one chamber operating under higher pressure than the other, a tube extending from one chamber to the other for ignition of fuel in one chamber from combustion in the other chamber, a valve operable to close the tube, and a fuel heater in heat exchange relation with the said tube for heating fuel for combustion in the power plant.

4. A gas turbine power plant comprising, in combination, a first compressor, a second compressor supplied thereby, a first combustion chamber supplied by the second compressor, a turbine energized by gases from the said combustion chamber, the said turbine driving the compressors, an exhaust duct for the turbine, a second combustion chamber supplied directly by the first compressor, an atmospheric exhaust nozzle for the second combustion chamber by-passing the turbine and turbine exhaust duct, means for reducing the capacity of the first compressor operable during starting of the turbine, and means for varying the area of the said exhaust nozzle.

5. A gas turbine power plant comprising, in combination, a first compressor, a second compressor supplied thereby, a first combustion chamber supplied by the second compressor, a turbine energized by gases from the said combustion chamber, the said turbine driving the compressors, an exhaust duct for the turbine, a second combustion chamber supplied directly by the first compressor, an atmospheric exhaust nozzle for the second combustion chamber by-passing the turbine and turbine exhaust duct, means for reducing the capacity of the first compressor operable during starting of the turbine, means for varying the area of the said exhaust nozzle, and an igniter tube extending from the first combustion chamber to the second combustion chamber to conduct hot gas from the first combustion chamber to the second combustion chamber for ignition of fuel therein.

6. A gas turbine power plant comprising, in combination, a first compressor, a second compressor supplied thereby, a first combustion chamber supplied by the second compressor, a turbine energized by gases from the said combustion chamber, the said turbine driving the compressors, an exhaust duct for the turbine, a second combustion chamber supplied directly by the first compressor, an atmospheric exhaust nozzle for the second combustion chamber by-passing the turbine and turbine exhaust duct, means for reducing the capacity of the first compressor operable during starting of the turbine, means for varying the area of the said exhaust nozzle, an igniter tube extending from the first combustion chamber to the second combustion chamber to conduct hot gas from the first combustion chamber to the second combustion chamber for ignition of fuel therein, a normally closed valve in the said tube, and means for opening the valve.

7. A gas turbine power plant comprising, in combination, a first compressor, a second compressor supplied thereby, a first combustion chamber supplied by the second compressor, a turbine energized by gases from the said combustion chamber, the said turbine driving the compressors, an exhaust duct for the turbine, a second combustion chamber supplied directly by the first compressor, an atmospheric exhaust nozzle for the second combustion chamber by-passing the turbine and turbine exhaust duct, means for reducing the capacity of the first compressor operable during starting of the turbine, means for varying the area of the said exhaust nozzle, an igniter tube extending from the first combustion chamber to the second combustion chamber to conduct hot gas from the first combustion chamber to the second combustion chamber for ignition of fuel therein, a normally closed valve in the said tube, the valve being located in one of the combustion chambers outside the combustion zone therein, and means for opening the valve.

8. A gas turbine power plant comprising, in combination, a first compressor, a second compressor supplied thereby, a first combustion chamber supplied by the second compressor, a turbine energized by gases from the said combustion chamber, the said turbine driving the compressors, an exhaust duct for the turbine, a second combustion chamber supplied directly by the first compressor, an atmospheric exhaust nozzle for the second combustion chamber by-passing the turbine and turbine exhaust duct, means for reducing the capacity of the first compressor operable during starting of the turbine, means for varying the area of the said exhaust nozzle, an igniter tube extending from the first combustion chamber to the second combustion chamber to conduct hot gas from the first combustion chamber to the second combustion chamber for ignition of fuel therein, a normally closed valve in the said tube, means for supplying fuel to the second combustion chamber, and means for concurrently rendering the said fuel supplying means operative and opening the valve.

References Cited in the file of this patent

UNITED STATES PATENTS

| | | |
|---|---|---|
| 1,289,960 | Taylor | Dec. 31, 1918 |
| 1,510,688 | La Fon | Oct. 7, 1924 |
| 2,280,835 | Lysholm | Apr. 28, 1942 |
| 2,396,911 | Anxionnaz et al. | Mar. 19, 1946 |
| 2,404,335 | Whittle | July 16, 1946 |
| 2,434,678 | Szczeniowski | Jan. 20, 1948 |
| 2,435,091 | Meyer | Jan. 20, 1948 |
| 2,460,778 | Willgoos | Feb. 1, 1949 |
| 2,503,006 | Stalker | Apr. 4, 1950 |
| 2,503,172 | Pullin | Apr. 4, 1950 |
| 2,504,181 | Constant | Apr. 18, 1950 |
| 2,526,409 | Price | Oct. 17, 1950 |
| 2,610,465 | Imbert et al. | Sept. 16, 1952 |
| 2,673,445 | Bruckmann | Mar. 30, 1954 |